(12) United States Patent
Ji et al.

(10) Patent No.: US 9,821,646 B2
(45) Date of Patent: Nov. 21, 2017

(54) POWER TRANSMISSION SYSTEM OF HYBRID ELECTRIC VEHICLE

(71) Applicant: Hyundai Motor Company, Seoul (KR)

(72) Inventors: Seongwook Ji, Ansan-si (KR); Jae Chang Kook, Hwaseong-si (KR); Wonmin Cho, Hwaseong-si (KR); Myeong Hoon Noh, Seongnam-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 172 days.

(21) Appl. No.: 14/701,021

(22) Filed: Apr. 30, 2015

(65) Prior Publication Data

US 2016/0167501 A1 Jun. 16, 2016

(30) Foreign Application Priority Data

Dec. 10, 2014 (KR) ........................ 10-2014-0177357

(51) Int. Cl.
*B60K 6/365* (2007.10)
*B60K 6/387* (2007.10)
*B60K 6/442* (2007.10)

(52) U.S. Cl.
CPC .............. *B60K 6/365* (2013.01); *B60K 6/387* (2013.01); *B60K 6/442* (2013.01); *Y02T 10/6234* (2013.01); *Y10S 903/91* (2013.01)

(58) Field of Classification Search
CPC ...................................................... B60K 6/365
See application file for complete search history.

(56) References Cited

U.S. PATENT DOCUMENTS

| 6,429,541 | B2 * | 8/2002 | Takenaka | B60K 6/365 |
| | | | | 180/65.6 |
| 8,226,513 | B2 | 7/2012 | Abe et al. | |
| 8,430,782 | B2 | 4/2013 | Akutsu et al. | |
| 9,126,576 | B2 * | 9/2015 | Ruhle | F16D 25/123 |
| 9,517,691 | B1 * | 12/2016 | Pritchard | B60K 6/52 |
| 2001/0025219 | A1 * | 9/2001 | Ohba | B60K 6/365 |
| | | | | 701/89 |
| 2009/0255746 | A1 * | 10/2009 | Boesch | B60K 6/365 |
| | | | | 180/197 |
| 2010/0324762 | A1 * | 12/2010 | Imaseki | B60K 6/36 |
| | | | | 701/22 |

(Continued)

FOREIGN PATENT DOCUMENTS

| JP | 5190701 B2 | 2/2013 |
| JP | 2013-203109 A | 10/2013 |

(Continued)

*Primary Examiner* — Tisha Lewis
(74) *Attorney, Agent, or Firm* — Morgan, Lewis & Bockius LLP

(57) ABSTRACT

A power transmission system may include: an engine power delivery module configured to transmit power of the engine directly to the first motor/generator as driving power for generating electricity and to selectively transmit the power of the engine as driving power for driving the vehicle, and a motor power delivery module disposed in parallel with and independently from the engine power delivery module, and configured to directly transmit power of the second motor/generator as driving power for driving the vehicle.

15 Claims, 6 Drawing Sheets

(56) References Cited

U.S. PATENT DOCUMENTS

2013/0252774 A1* 9/2013 Suntharalingam ..... B60K 6/365
475/5
2013/0252783 A1* 9/2013 Suntharalingam ..... B60K 6/365
477/5
2014/0121867 A1* 5/2014 Tamai ................... B60W 10/06
701/22

FOREIGN PATENT DOCUMENTS

| JP | 2014-19328 A | 2/2014 |
| KR | 10-1427971 B1 | 8/2014 |
| KR | 10-1459472 B1 | 11/2014 |

* cited by examiner

POWER TRANSMISSION SYSTEM OF HYBRID ELECTRIC VEHICLE

CROSS-REFERENCE TO RELATED APPLICATION

The present application claims priority to and the benefit of Korean Patent Application No. 10-2014-0177357 filed on Dec. 10, 2014, the entire contents of which is incorporated herein for all purposes by this reference.

BACKGROUND OF THE INVENTION

Field of the Invention

The present invention relates to a power transmission system of a hybrid electric vehicle. More particularly, the present invention relates to a power transmission system of a hybrid electric vehicle that can minimizes weight and manufacturing cost by simplifying inner structures and improve mountability by disposing components in parallel and minimizing a length thereof.

Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Therefore, the vehicle makers have been developing future vehicles such as electric vehicles (EV), hybrid electric vehicles (HEV), and fuel cell electric vehicles (FCEV).

Since the future vehicles have technical restrictions such as weight and cost, the vehicle makers keep observation upon hybrid electric vehicles for meeting exhaust gas regulations and improving fuel consumption performance and are competing desperately to put the hybrid electric vehicles to practical use.

The hybrid electric vehicles are vehicles using more than two power source, and gasoline engines or diesel engines using fossil fuel and motor/generators driven by electrical energy are mainly used as the power source of the hybrid electric vehicles.

The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depend on connections of the planetary gear sets, the motor/generators, and the torque delivery apparatus.

In addition, the power transmission system of the multi-mode type has different features such a durability, power delivery efficiency, and size depend on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid electric vehicle having advantages of minimizing weight and manufacturing cost by simplifying inner structures and of improving mountability by disposing components in parallel and minimizing a length thereof.

A power transmission system of a hybrid electric vehicle according to an exemplary embodiment of the present invention may use an engine and first and second motor/generators as power sources.

The power transmission system may include: an engine power delivery module configured to transmit power of the engine directly to the first motor/generator as driving power for generating electricity and to selectively transmit the power of the engine as driving power for driving the vehicle; and a motor power delivery module disposed in parallel with and independently from the engine power delivery module, and configured to directly transmit power of the second motor/generator as driving power for driving the vehicle.

The engine power delivery module may include: a first input shaft directly connected to the engine and configured to receive the power of the engine; an intermediate shaft configured to receive power of the first input shaft through a planetary gear set and to transmit the power of the first input shaft to the first motor/generator; and a first output shaft disposed in parallel with the first input shaft, continuously or selectively receiving the power of the first input shaft, and selectively transmitting the power of the first input shaft to a final reduction gear of a differential apparatus.

The intermediate shaft may be a hollow shaft and be disposed at a radial exterior of and concentrically with the first input shaft, and the planetary gear set and the first motor/generator may be disposed respectively at a radial exterior of both end portions of the intermediate shaft.

The planetary gear set may be disposed at a rear end portion of the intermediate shaft and the first motor/generator may be disposed at a front end portion of the intermediate shaft.

The planetary gear set may be a single pinion planetary gear set.

The planetary gear set may be configured to increase a rotation speed of the first input shaft and to transmit the increased rotation speed to the first motor/generator.

The planetary gear set may include a sun gear directly connected to the first motor/generator, a planet carrier directly connected to the first input shaft, and a ring gear directly connected to a transmission housing.

The first input shaft may be provided with a first drive gear fixedly disposed on a rear end thereof and configured to output power.

A first driven gear meshed with the first drive gear may be fixedly disposed on one end portion of the first output shaft, and a first output gear meshed with the final reduction gear of the differential apparatus may be fixedly disposed on the other end portion of the first output shaft.

In one aspect, a clutch configured to selectively transmit power or not may be disposed on the first input shaft.

In another aspect, a clutch configured to selectively transmit power or not may be disposed on the first output shaft.

The motor power delivery module may include: a second input shaft disposed in parallel with the first input shaft and receiving power of the second motor/generator; and a first output shaft disposed in parallel with the second input shaft, receiving the power of the second input shaft and transmitting the power of the second input shaft to the final reduction gear of the differential apparatus.

The second input shaft may be provided with a second drive gear outputting power of the second input shaft and fixedly disposed on a front end portion thereof.

A second driven gear meshed with the second drive gear may be fixedly disposed on one end portion of the second output shaft, and a second output gear meshed with the final reduction gear of the differential apparatus may be fixedly disposed on the other end portion of the second output shaft.

A power transmission system of a hybrid electric vehicle according to another exemplary embodiment of the present invention may include: an engine power delivery module including a first input shaft directly connected to the engine so as to receive power of the engine, an intermediate shaft connected to the first input shaft through a planetary gear set and directly connected to the first motor/generator so as to receive power of the first input shaft and to transmit the power of the first input shaft to the first motor/generator, and a first output shaft disposed in parallel with the first input shaft, receiving the power of the first input shaft and transmitting the power of the first input shaft to a final reduction gear of a differential apparatus, and configured to transmit the power of the engine to the first motor/generator as driving power for generating electricity and to selectively transmit the power of the engine as driving power for driving the vehicle; and a motor power delivery module including a second input shaft disposed in parallel with the first input shaft and receiving power of the second motor/generator, and a first output shaft disposed in parallel with the second input shaft, receiving power of the second input shaft and transmitting the power of the second input shaft to the final reduction gear of the differential apparatus, and configured to transmit the power of the second motor/generator as driving power for driving the vehicle.

The intermediate shaft may be a hollow shaft and be disposed at a radial exterior of and concentrically with the first input shaft, and the planetary gear set and the first motor/generator may be disposed respectively at a radial exterior of both end portions of the intermediate shaft.

The planetary gear set may be disposed at a rear end portion of the intermediate shaft and the first motor/generator may be disposed at a front end portion of the intermediate shaft.

The planetary gear set may be configured to increase a rotation speed of the first input shaft and to transmit the increased rotation speed to the first motor/generator.

The planetary gear set may be a single pinion planetary gear set including a sun gear directly connected to the first motor/generator, a planet carrier directly connected to the first input shaft, and a ring gear directly connected to a transmission housing.

A clutch configured to selectively transmit power or not may be disposed on the first input shaft or the first output shaft.

An exemplary embodiment of the present invention may improve fuel economy greatly compared with a conventional vehicle by providing electric vehicle (EV), hybrid electric vehicle (HEV), and engine mode using an engine and two motor/generators as power sources.

In addition, since shifting components are dispersedly disposed on four shafts disposed in parallel with each other, a length of transmission may be shortened and mountability may be improved.

In addition, an exemplary embodiment of the present invention may be applied to a low-cost hybrid electric vehicle by simplifying inner structures and reducing weight and manufacturing cost.

In addition, since a compound type of transmission where series type and parallel type are combined is used, power delivery efficiency and fuel economy may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
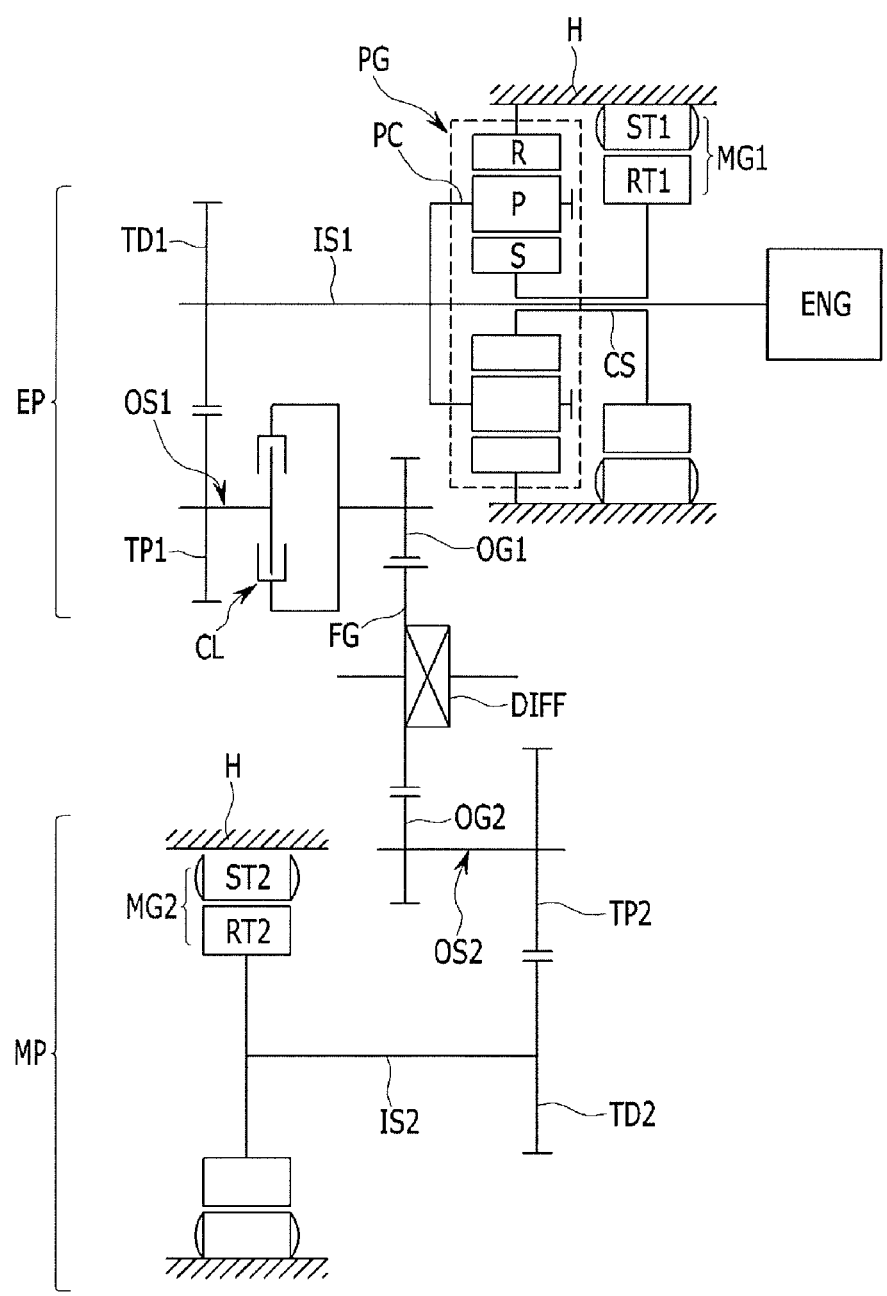
FIG. 1 is a schematic diagram of a power transmission system of a hybrid electric vehicle according to the various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmission system according to the first exemplary embodiment of the present invention.

Referring to FIG. 1, a power transmission system of a hybrid electric vehicle according to an exemplary embodiment of the present invention includes an engine ENG and/or first and second motor/generators MG1 and MG2 as power sources. The power transmission system includes an engine power delivery module EP that transmits power of the engine ENG to the first motor/generator MG1 and selectively transmits the power of the engine ENG to a final reduction gear FG of a differential apparatus DIFF, and a motor power delivery module MP that transmits power of the second motor/generator MG2 to the final reduction gear FG of the differential apparatus DIFF.

The engine power delivery module EP includes the engine ENG, a first input shaft IS1, an intermediate shaft CS, the first motor/generator MG1, a planetary gear set PG, a first output shaft OS1 and a clutch CL, and the motor power delivery module MP includes the second motor/generator MG2, a second input shaft IS2 and a second output shaft OS2.

The engine ENG is a main power source, and a gasoline engine or a diesel engine which uses typical fossil fuel may be used as the engine. An output side of the engine ENG is connected to the first input shaft IS1.

The first input shaft IS1 is directly connected to the output side of the engine ENG without passing through a torque converter and a clutch or is indirectly connected to the output side of the engine ENG with passing through the torque converter and the clutch. A first drive gear TD1 may be fixedly disposed on a rear end portion of the first input shaft IS1.

In addition, the intermediate shaft CS is disposed at a radial exterior of and concentrically with the first input shaft IS1, and the first motor/generator MG1 and the planetary gear set PG are disposed on the intermediate shaft CS.

The first motor/generator MG1 functions as a motor or a generator, and includes a first stator ST1 fixed to a transmission housing H and a first rotor RT1 rotatably supported by the first stator ST1 in a radial interior thereof. The first rotor RT1 may be directly connected to the intermediate shaft CS.

The planetary gear set PG may be a simple planetary gear set such as a single pinion planetary gear set or a double pinion planetary gear set. It is exemplified in the exemplary embodiment of the present invention that the planetary gear set PG is a single pinion planetary gear set.

The planetary gear set PG includes a sun gear S, a ring gear R, and a planet carrier PC rotatably supporting a plurality of pinions P meshed with the sun gear S and the ring gear R.

The sun gear S is directly connected to the intermediate shaft CS, the ring gear R is directly connected to the transmission housing H, and the planet carrier PC is directly connected to the first input shaft IS1.

If a rotation speed of the engine ENG is input to the planetary gear set PG through the planet carrier PC, the rotation speed is increased by the sun gear S and is transmitted to the first motor/generator MG1. If a rotation speed of the first motor/generator MG1, on the contrary, is input to the planetary gear set PG through the sun gear S, the rotation speed is reduced and output through the planet carrier PC.

In addition, it is illustrated in FIG. 1 but is not limited that the first motor/generator MG1 is disposed in front of the planetary gear set PG. That is, the first motor/generator MG1 may be disposed at a rear side of the planetary gear set PG2.

The first output shaft OS1 is disposed apart from and in parallel with the first input shaft IS1, and a first driven gear TP1 meshed with the first drive gear TD1 and a first output gear OG1 meshed with the final reduction gear FG of the differential apparatus DIFF are fixedly disposed on the first output shaft OS1.

In addition, the clutch CL is disposed on the first output shaft OS1 and selectively transmits power of the engine ENG and/or the first motor/generator MG1 to the final reduction gear FG or not.

Therefore, the engine power delivery module EP transmits power of the engine ENG to the first motor/generator MG1 through the first input shaft IS1, the planetary gear set PG1, and the intermediate shaft CS, and selectively transmits the power of the engine ENG to the final reduction gear FG of the differential apparatus DIFF through the first input shaft IS1 and the first output shaft OS1 depending on whether the clutch CL operates or not.

The second input shaft IS2 is disposed in parallel with and apart from the first input shaft IS1. A second drive gear TD2 is fixedly disposed on a front end portion of the second input shaft IS2.

In addition, the second motor/generator MG2 is disposed on the second input shaft IS2.

The second motor/generator MG2 functions as a motor or a generator, and includes a second stator ST2 fixed to the transmission housing II and a second rotor RT2 rotatably supported by the second stator ST2 in a radial interior thereof. The second rotor RT2 is directly connected to the second input shaft IS2.

The second output shaft OS2 is disposed in parallel with and apart from the second input shaft IS2, and a second driven gear TP2 meshed with the second drive gear TD2 and a second output gear OG2 meshed with the final reduction gear FG of the differential apparatus DIFF are fixedly disposed on the second output shaft OS2.

Therefore, the motor power delivery module MP transmits power of the second motor/generator MG2 to the final reduction gear FG of the differential apparatus DIFF through the second input shaft IS2 and the second output shaft OS2.

Figure 2:
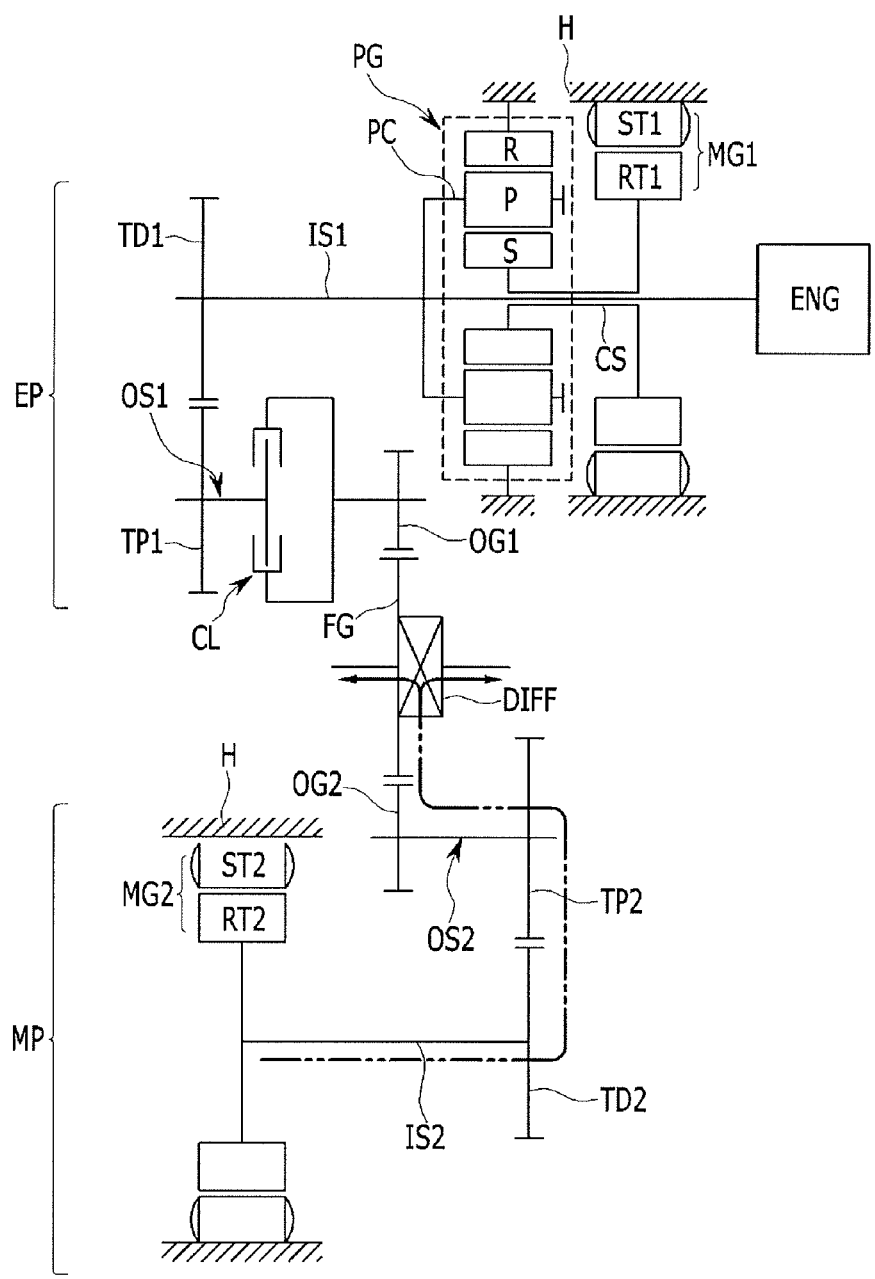
FIG. 2 illustrates power flow at electric vehicle (EV) mode in a power transmission system of a hybrid electric vehicle according to the various exemplary embodiments of the present invention.

FIG. 2 illustrates power flow at electric vehicle (EV) mode in a power transmission system of a hybrid electric vehicle according to the first exemplary embodiment of the present invention.

Referring to FIG. 2, in a state that the engine ENG is stopped and the clutch CL is released, driving power of the second motor/generator MG2 is transmitted to the final reduction gear FG of the differential apparatus DIFF through the second input shaft IS2, the second drive gear TD2, the second driven gear TP2, the second output shaft OS2 and the second output gear OG2 at EV mode.

That is, electric continuously variable shifting is achieved by controlling rotation speed of the second motor/generator MG2, and the vehicle runs by the driving power of the second motor/generator MG2.

Figure 3:
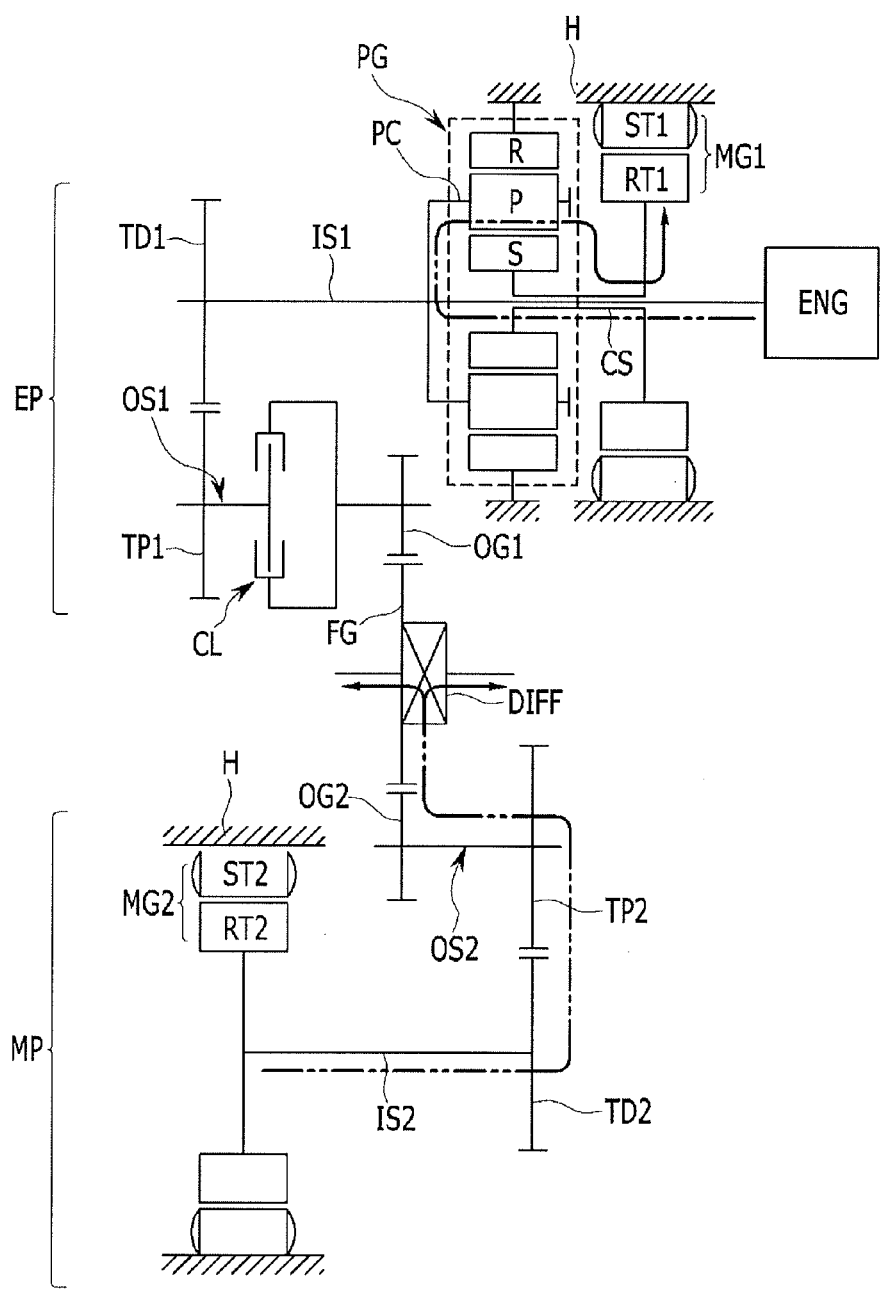
FIG. 3 illustrates power flow at first hybrid electric vehicle (HEV) mode in a power transmission system of a hybrid electric vehicle according to the various exemplary embodiments of the present invention.

FIG. 3 illustrates power flow at first hybrid electric vehicle (HEV) mode in a power transmission system of a hybrid electric vehicle according to the first exemplary embodiment of the present invention.

Referring to FIG. 3, the power of the engine ENG is transmitted to the first motor/generator MG1 as driving power for generating electricity, and the power of the second motor/generator MG2 is transmitted as driving power for driving the vehicle at first HEV mode.

That is, the power of the engine ENG is transmitted to the first motor/generator MG1 through the first input shaft IS1, the planetary gear set PG, and the intermediate shaft CS.

In addition, the power of the second motor/generator MG2 is transmitted to the final reduction gear FG of the differential apparatus DIFF through the second input shaft IS2, the second drive gear TD2, the second driven gear TP2, the second output shaft OS2, and the second output gear OG2.

Electrical energy generated by the first motor/generator MG1 is used for driving the second motor/generator MG2 or is stored in a battery.

Figure 4:
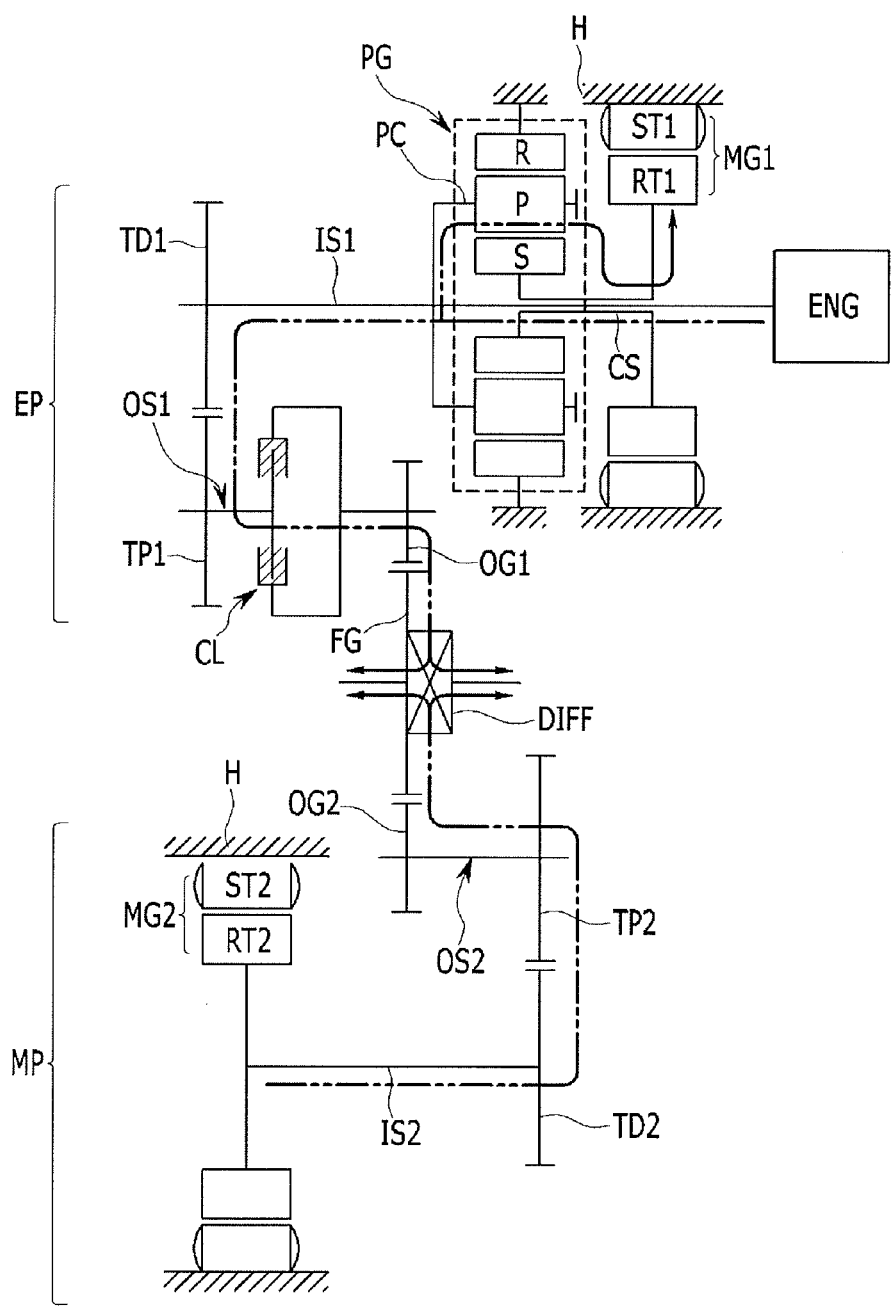
FIG. 4 illustrates power flow at second HEV mode in a power transmission system of a hybrid electric vehicle according to the various exemplary embodiments of the present invention.

FIG. 4 illustrates power flow at second HEV mode in a power transmission system of a hybrid electric vehicle according to the first exemplary embodiment of the present invention.

Referring to FIG. 4, the power of the engine ENG is transmitted as driving power for driving the vehicle and is transmitted to the first motor/generator MG1 as driving power for generating electricity, and the power of the second motor/generator MG2 is transmitted as auxiliary power for driving the vehicle at second HEV mode.

That is, the power of the engine ENG is transmitted to the first motor/generator MG1 through the first input shaft IS1, the planetary gear set PG, and the intermediate shaft CS and is transmitted to the final reduction gear FG of the differential apparatus DIFF through the first drive gear TD1, the first driven gear TP1, the first output shaft OS1, the clutch CL, and the first output gear OG1 by operation of the clutch CL.

In addition, the power of the second motor/generator MG2 is transmitted to the final reduction gear FG of the differential apparatus DIFF through the second input shaft IS2, the second drive gear TD2, the second driven gear TP2, the second output shaft OS2, and the second output gear OG2.

Electrical energy generated by the first motor/generator MG1 is used for driving the second motor/generator MG2 or is stored in the battery.

Figure 5:
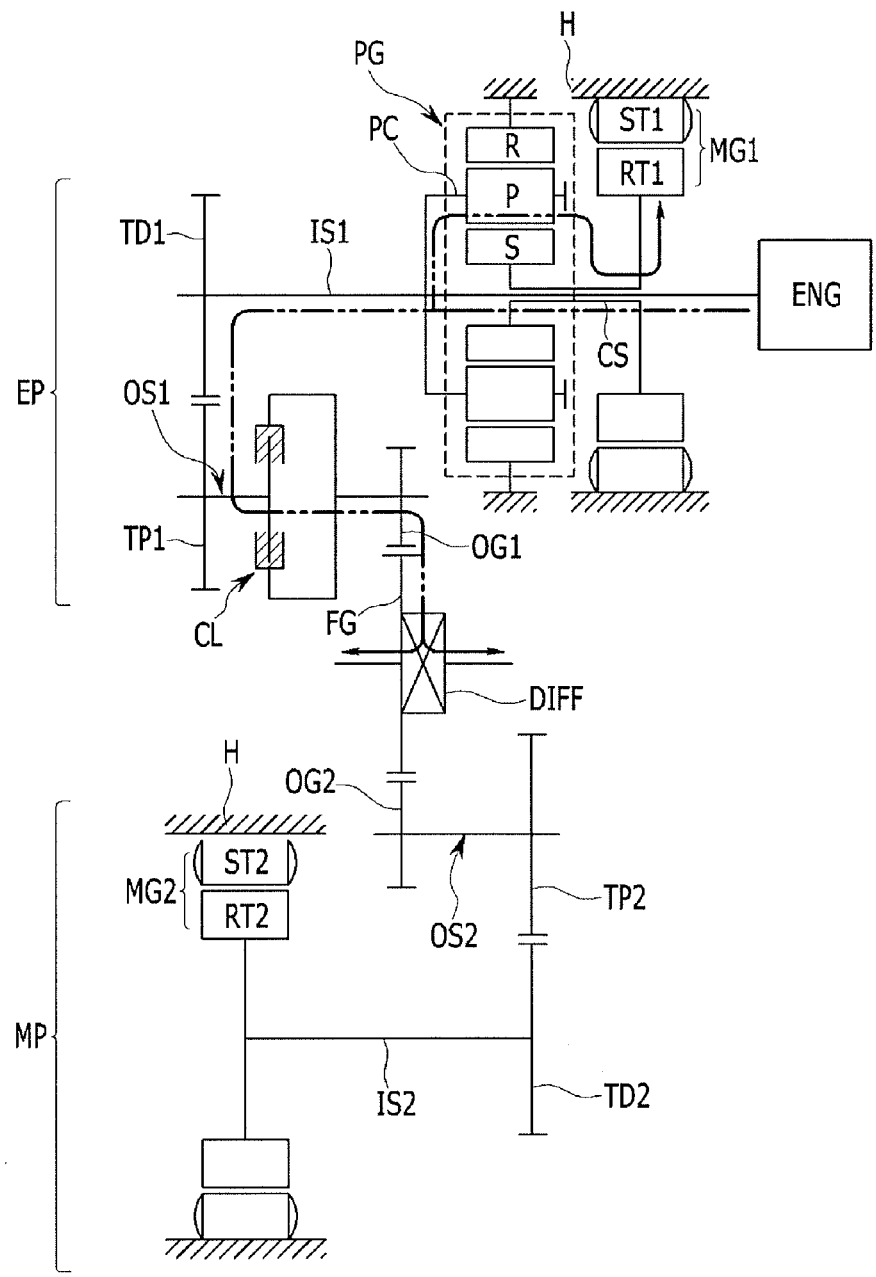
FIG. 5 illustrates power flow at engine mode in a power transmission system of a hybrid electric vehicle according to the various exemplary embodiments of the present invention.

FIG. 5 illustrates power flow at engine mode in a power transmission system of a hybrid electric vehicle according to the first exemplary embodiment of the present invention.

Referring to FIG. 5, the second motor/generator MG2 is not operated and the vehicle runs only by the power of the engine ENG at engine mode.

Therefore, the power of the engine ENG is transmitted to the first motor/generator MG1 through the first input shaft IS1, the planetary gear set PG, and the intermediate shaft CS, and is transmitted to the final reduction gear FG of the differential apparatus DIFF through the first drive gear TD1, the first driven gear TP1, the first output shaft OS1, the clutch CL, and the first output gear OG1 by operation of the clutch CL. Thereby, the vehicle runs.

Figure 6:
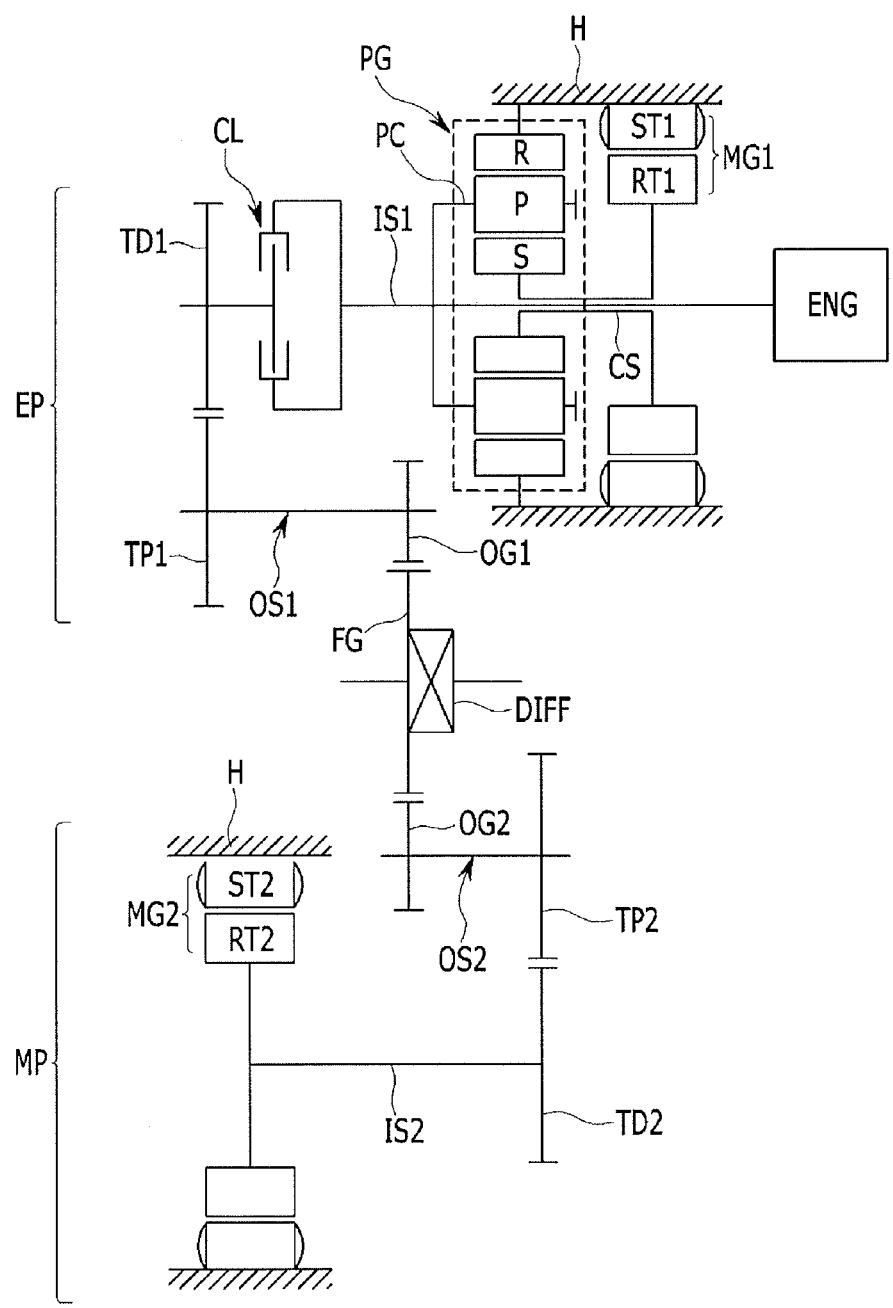
FIG. 6 is a schematic diagram of a power transmission system of hybrid electric vehicle according to the various exemplary embodiments of the present invention.

FIG. 6 is a schematic diagram of a power transmission system of hybrid electric vehicle according to the second exemplary embodiment of the present invention.

Referring to FIG. 6, a position of the clutch CL in the second exemplary embodiment of the present invention is different from that in the first exemplary embodiment.

That is, the clutch CL is disposed on the first output shaft OS1 in the first exemplary embodiment, but the clutch CL is disposed on the first input shaft IS1 in the second exemplary embodiment.

Since structures of the second exemplary embodiment are the same as those of the first exemplary embodiment except the position of the clutch CL, detailed description thereof will be omitted.

The power transmission system according to the exemplary embodiments of the present invention may achieve the EV mode, the HEV mode, and the engine mode by using the engine and two motor/generators. Therefore, the exemplary embodiments of the present invention may greatly improve fuel economy, compared with a conventional internal combustion engine vehicle.

In addition, since shifting components are dispersedly disposed on four shafts disposed in parallel with each other, a length of transmission may be minimized.

In addition, an exemplary embodiment of the present invention may be applied to a low-cost hybrid electric vehicle by simplifying inner structures and reducing weight and manufacturing cost.

In addition, since a compound type of transmission where series type and parallel type are combined is used, power delivery efficiency and fuel economy may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmission system of a hybrid electric vehicle that uses an engine and first and second motor/generators as power sources, comprising:
   an engine power delivery module transmitting power of the engine directly to the first motor/generator as driving power for generating electricity and selectively transmitting the power of the engine as driving power for driving the vehicle; and
   a motor power delivery module disposed in parallel with and independently from the engine power delivery module, and directly transmitting power of the second motor/generator as driving power for driving the vehicle,
   wherein the engine power delivery module comprises:
      a first input shaft directly connected to the engine and receiving the power of the engine;
      a planetary gear set including a sun gear directly connected to the first motor/generator, a planet carrier directly connected to the first input shaft, and a ring gear directly connected to a transmission housing to transmit power of the first shaft to the first motor/generator with a rotation speed of the first input shaft being increased whenever the engine operates;
      an intermediate shaft directly connecting the sun gear with the first motor/generator to transmit the power of the first input shaft to the first motor/generator; and
      a first output shaft disposed in parallel with the first input shaft and selectively and operably connecting the first input shaft with a differential apparatus through a clutch, and
      wherein the first input shaft is provided with a first drive gear fixedly disposed on a rear end thereof and meshed with a first driven gear fixedly disposed on the first output shaft.

2. The power transmission system of claim 1, wherein the intermediate shaft is a hollow shaft and is disposed at a radial exterior of and concentrically with the first input shaft, and the planetary gear set and the first motor/generator are disposed respectively at a radial exterior of both end portions of the intermediate shaft.

3. The power transmission system of claim 2, wherein the planetary gear set is disposed at a rear end portion of the intermediate shaft and the first motor/generator is disposed at a front end portion of the intermediate shaft.

4. The power transmission system of claim 3, wherein the planetary gear set is a single pinion planetary gear set.

5. The power transmission system of claim 1, wherein the first output shaft is provided with the first driven gear disposed on a first end portion of the first output shaft, and a first output gear meshed with a final reduction gear of the differential apparatus and fixedly disposed on a second end portion of the first output shaft.

6. The power transmission system of claim 1, wherein the clutch is disposed on the first input shaft.

7. The power transmission system of claim 1, wherein the clutch is disposed on the first output shaft.

8. The power transmission system of claim 1, wherein the motor power delivery module comprises:
   a second input shaft disposed in parallel with the first input shaft and receiving power of the second motor/generator; and
   a second output shaft disposed in parallel with the second input shaft, receiving the power of the second input shaft and transmitting the power of the second input shaft to the differential apparatus.

9. The power transmission system of claim 8, wherein the second input shaft is provided with a second drive gear outputting power of the second input shaft and fixedly disposed on a front end portion thereof.

10. The power transmission system of claim 9, wherein a second driven gear meshed with the second drive gear is fixedly disposed on a first end portion of the second output shaft, and a second output gear meshed with a final reduction gear of the differential apparatus is fixedly disposed on a second end portion of the second output shaft.

11. A power transmission system of a hybrid electric vehicle that uses an engine and first and second motor/generators as power sources, comprising:
   an engine power delivery module including a first input shaft directly connected to the engine to receive power of the engine, a planetary gear set including a sun gear directly connected to the first motor/generator, a planet carrier directly connected to the first input shaft, and a ring gear directly connected to a transmission housing to transmit power of the first shaft to the first motor/generator with a rotation speed of the first input shaft being increased whenever the engine operates, an intermediate shaft directly connecting the sun gear with the first motor/generator to transmit the power of the first input shaft to the first motor/generator, and a first output shaft disposed in parallel with the first input shaft and selectively and operably connecting the first input shaft with a differential apparatus through a clutch; and
   a motor power delivery module including a second input shaft disposed in parallel with the first input shaft and receiving power of the second motor/generator, and a second output shaft disposed in parallel with the second input shaft, receiving power of the second input shaft and transmitting the power of the second input shaft to the differential apparatus,
   wherein the first input shaft is provided with a first driven gear fixedly disposed on a rear end of the first input shaft and meshed with a first drive gear fixedly disposed on the first output shaft.

12. The power transmission system of claim 11, wherein the intermediate shaft is a hollow shaft and is disposed at a radial exterior of and concentrically with the first input shaft, and the planetary gear set and the first motor/generator are disposed respectively at a radial exterior of both end portions of the intermediate shaft.

13. The power transmission system of claim 12, wherein the planetary gear set is disposed at a rear end portion of the intermediate shaft and the first motor/generator is disposed at a front end portion of the intermediate shaft.

14. The power transmission system of claim 13, wherein the planetary gear set is a single pinion planetary gear set.

15. The power transmission system of claim 11, wherein the clutch is disposed on the first input shaft or the first output shaft.

* * * * *